US010240071B2

(12) United States Patent
Schumacher et al.

(10) Patent No.: US 10,240,071 B2
(45) Date of Patent: Mar. 26, 2019

(54) AQUEOUS ADHESIVE DISPERSION CONTAINING POLYURETHANES AND ETHOXYLATED FATTY ALCOHOLS

(71) Applicant: BASF SE, Ludwigshafen (DE)

(72) Inventors: Karl-Heinz Schumacher, Neustadt (DE); Gemma Sanders, Mannheim (DE); Kimberly Simancas, Stuttgart (DE); Oliver Hartz, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 11 days.

(21) Appl. No.: 15/529,177

(22) PCT Filed: Dec. 2, 2015

(86) PCT No.: PCT/EP2015/078370
§ 371 (c)(1),
(2) Date: May 24, 2017

(87) PCT Pub. No.: WO2016/087518
PCT Pub. Date: Jun. 9, 2016

(65) Prior Publication Data
US 2017/0355887 A1    Dec. 14, 2017

(30) Foreign Application Priority Data

Dec. 5, 2014 (EP) .................................. 14196561

(51) Int. Cl.

| | |
|---|---|
| *C09J 175/06* | (2006.01) |
| *C09J 175/08* | (2006.01) |
| *C09J 11/06* | (2006.01) |
| *B32B 27/40* | (2006.01) |
| *C08G 18/66* | (2006.01) |
| *C08G 18/72* | (2006.01) |
| *C08G 18/73* | (2006.01) |
| *C08G 18/76* | (2006.01) |
| *C08K 5/06* | (2006.01) |
| *C08G 18/08* | (2006.01) |
| *C08G 18/38* | (2006.01) |
| *C08G 18/42* | (2006.01) |
| *C09J 175/04* | (2006.01) |
| *B32B 7/12* | (2006.01) |
| *B32B 27/08* | (2006.01) |
| *C08K 5/05* | (2006.01) |
| *C08G 18/48* | (2006.01) |

(52) U.S. Cl.
CPC ................ *C09J 11/06* (2013.01); *B32B 7/12* (2013.01); *B32B 27/08* (2013.01); *B32B 27/40* (2013.01); *C08G 18/0823* (2013.01); *C08G 18/3821* (2013.01); *C08G 18/4238* (2013.01); *C08G 18/6651* (2013.01); *C08G 18/724* (2013.01); *C08G 18/73* (2013.01); *C08G 18/7621* (2013.01); *C08K 5/06* (2013.01); *C09J 175/04* (2013.01); *C09J 175/06* (2013.01); *B32B 2307/546* (2013.01); *B32B 2451/00* (2013.01); *B32B 2605/003* (2013.01); *C08G 18/4854* (2013.01); *C08G 2170/80* (2013.01); *C08K 5/05* (2013.01); *C09J 175/08* (2013.01)

(58) Field of Classification Search
None
See application file for complete search history.

(56) References Cited

U.S. PATENT DOCUMENTS

| | | | |
|---|---|---|---|
| 3,412,054 A | 11/1968 | Milligan et al. | |
| 3,905,929 A | 9/1975 | Noll | |
| 3,920,598 A | 11/1975 | Reiff et al. | |
| 4,192,937 A | 3/1980 | Noll et al. | |
| 4,269,748 A | 5/1981 | Nachtkamp et al. | |
| 4,292,226 A | 9/1981 | Wenzel et al. | |
| 5,672,768 A * | 9/1997 | Gupta .................... | A61K 8/86 568/621 |
| 2005/0080203 A1 | 4/2005 | Radovich et al. | |
| 2010/0055370 A1 | 3/2010 | Diehl et al. | |
| 2011/0150806 A1* | 6/2011 | Bui ......................... | A61K 8/39 424/70.7 |
| 2017/0226377 A1* | 8/2017 | Jahns .................... | C09D 175/08 |

FOREIGN PATENT DOCUMENTS

| | | |
|---|---|---|
| CA | 1 129 128 A | 8/1982 |
| DE | 1 954 090 A1 | 5/1971 |
| DE | 2 034 479 A1 | 1/1972 |

(Continued)

OTHER PUBLICATIONS

International Search Report dated Feb. 24, 2016 in PCT/EP2015/078370 (with English translation).
International Preliminary Report on Patentability and Written Opinion of the International Searching Authority dated Jun. 15, 2017 in PCT/EP2015/078370 filed Dec. 2, 2015 (with English translation).
U.S. Appl. No. 14/766,807, filed Aug. 10, 2015, US 2016/0002486 A1, Andrea Kuntz, et al.

(Continued)

*Primary Examiner* — Richard A Huhn
(74) *Attorney, Agent, or Firm* — Oblon, McClelland, Maier & Neustadt, L.L.P.

(57) ABSTRACT

Described are aqueous adhesive dispersions comprising dispersed polyurethanes and also ethoxylated fatty alcohols as emulsifiers. The polyurethanes are constructed from certain organic diisocyanates, dihydroxy compounds selected from certain polyester diols and polyether diols, and compounds having groups reactive toward isocyanate groups and having at least one ionic group. The adhesive dispersions can be used as laminating adhesives, for example for composite film lamination or for the lamination of rigid moldings with flexible decorative foils.

19 Claims, No Drawings

(56) References Cited

FOREIGN PATENT DOCUMENTS

| | | |
|---|---|---|
| DE | 39 11 827 A1 | 10/1990 |
| EP | 2 166 057 A1 | 3/2010 |
| EP | 2 359 805 A1 | 8/2011 |
| WO | WO 2006/087317 A2 | 8/2006 |
| WO | WO 2006/087348 A1 | 8/2006 |
| WO | WO 2007/028760 A1 | 3/2007 |

* cited by examiner

AQUEOUS ADHESIVE DISPERSION CONTAINING POLYURETHANES AND ETHOXYLATED FATTY ALCOHOLS

The invention relates to aqueous adhesive dispersions comprising certain dispersed polyurethanes and also ethoxylated fatty alcohols as emulsifiers. The adhesive dispersions can be used as laminating adhesives, for composite film lamination, for example.

The colloidal stability of aqueous polyurethane dispersions is customarily generated through the copolymerization of compounds having ionogenic groups or through the incorporation of functions which can be converted into ionogenic groups, examples being carboxylic acid groups or sulfonic acid groups. Examples are chain extenders such as the sodium salt of ethylenediaminemonopropionic acid or the sodium salt of ethylenediaminemonoethanesulfonic acid, or the incorporation of dimethylolpropionic acid (DMPA) with subsequent neutralization of the carboxyl function. Aqueous polyurethane dispersions of this kind are described in WO 2007/028760, WO 06/087348, or WO 06/087317, for example. The colloidal stability of the dispersions that is achievable in this way is sufficient for many industrial adhesive applications. In certain application procedures, however, in which high shearing forces act on the dispersion, as for example in operations of roll-system application or in shear-intensive pumping processes, dispersions stabilized in this way frequently form coagulum, however, owing to lack of colloidal stability, and this adversely affects their industrial application. This problem occurs to an increased extent if the polyurethane dispersion is additionally exposed to an elevated electrolyte concentration, as in the case of dilution with hard water or of formulation with ion-rich additives, for example.

The object of the invention was to achieve a significant increase in the shear stability and/or electrolyte stability of aqueous polyurethane dispersions, especially for adhesives applications, in order as far as possible to avoid the above-described problems affecting application. At the same time, the other, desired performance properties of the adhesive dispersions, particularly the bonding properties and the foam behavior, ought as far as possible not to change. A considerably increased tendency to form foam can lead to application problems, as for example to faults in the coating pattern as a result of dried foam, something which as far as possible ought to be avoided.

As a solution to the problem it has been found that by adding, for example, 0.5-2 weight % (based on solids content) of at least one fatty alcohol ethoxylate, it is possible to achieve considerable improvements both in the shear stability and in the electrolyte stability of the dispersion, without significantly raising the foaming of the dispersion during processing, and without detracting unacceptably from the bonding properties.

The invention provides an aqueous adhesive dispersion comprising
- a) at least one dispersed polyurethane constructed from
- a1) at least one organic diisocyanate, selected from diisocyanates of the formula $X(NCO)_2$, where X is a noncyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 15 carbon atoms,
- a2) at least one dihydroxy compound selected from polyester diols and polyether diols, the polyester diols being formed from at least one aliphatic dicarboxylic acid and at least one alkanediol, and the polyetherdiols being selected from polypropylene oxide and polytetrahydrofuran,
- a3) at least one compound having at least one group reactive toward isocyanate groups, and additionally carrying at least one ionic group or one group which can be converted into an ionic group,
- a4) optionally further compounds different from a1) to a3), and
- b) at least one nonionic emulsifier selected from ethoxylated fatty alcohols.

Suitable diisocyanates a1) are, for example, tetramethylene diisocyanate, hexamethylene diisocyanate (HDI), dodecamethylene diisocyanate, 1,4-diisocyanatocyclohexane, 1-isocyanato-3,5,5-trimethyl-5-isocyanatonnethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene (TDI), 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomers, and also mixtures consisting of these compounds. Diisocyanates of this kind are available commercially. With particular preference the diisocyanate a1) is selected from the group consisting of hexamethylene diisocyanate, 1-isocyanato-3,5,5-trimethyl-5-isocyanatomethylcyclohexane, 2,6-diisocyanatotoluene, and tetramethylxylylene diisocyanate, or a mixture thereof.

Significant mixtures of these diisocyanates are in particular the mixtures of the respective structural isomers of diisocyanatotoluene and of diisocyanatodiphenylmethane, particularly suitability being possessed by the mixture of 80 mol % 2,4-diisocyanatotoluene and 20 mol % 2,6-diisocyanatotoluene. Also particularly advantageous are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, with the preferred mixing ratio of the aliphatic to aromatic isocyanates being 4:1 to 1:4.

The dihydroxy compounds a2) preferably have a number-average molar weight of 500 to 5000 g/mol, preferably of 1000 to 3000 g/mol. The dihydroxy compounds a2) preferably comprise no ionic group or group which can be converted into an ionic group.

The dihydroxy compounds a2) may be polyester diols. Preference is given to using polyester diols obtained by reacting dihydric alcohols with dibasic carboxylic acids. Instead of the free dicarboxylic acids it is also possible to use the corresponding dicarboxylic anhydrides or corresponding dicarboxylic esters of lower alcohols (alcohols having 1 to 4 C atoms) or mixtures thereof for preparing the polyester diols. The dicarboxylic acids are aliphatic. Preferred dicarboxylic acids are those of the general formula HOOC—$(CH_2)_y$—COOH, where y is a number from 1 to 20, preferably an even number from 2 to 20, examples being succinic acid, adipic acid, sebacic acid, and dodecanedicarboxylic acid. Adipic acid is particularly preferred.

Examples of alkanediols contemplated include ethylene glycol, propane-1,2-diol, propane-1,3-diol, butane-1,3-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol, and polybutylene glycols. Preferred dialcohols are those of the general formula HO—($CH_2$)$_x$—OH, where x is a number from 1 to 20, preferably an even number from 2 to 20. Examples thereof are ethylene glycol, butane-1,4-diol, hexane-1,6-diol, octane-1,8-diol, dodecane-1,12-diol, and neopentyl glycol. Butane-1,4-diol and hexane-1,6-diol are particularly preferred.

The dihydroxy compounds a2) may be polyether diols, selected from polypropylene oxide and polytetrahydrofuran. The polyether diols are obtainable in particular by polymerization of propylene oxide or tetrahydrofuran with itself, in the presence of $BF_3$, for example, or by addition reaction of these compounds, optionally in a mixture or in succession, with starter components containing reactive hydrogen atoms, such as alcohols or amines, examples being water, ethylene glycol, propane-1,2-diol, propane-1,3-diol, 2,2-bis(4-hydroxyphenyl)propane, or aniline. A suitable polytetrahydrofuran has, for example, a number-average molecular weight of 240 to 5000 g/mol or of 500 to 5000 g/mol or of 500 to 4500 g/mol.

The polyurethane is preferably formed from at least 50 weight %, more preferably at least 85 weight %, very preferably at least 95 weight % or of 100 weight %, based on all the dihydroxy compounds, of the polyester diols or polyether diols a2). Use may also be made of mixtures of the aforementioned polyester diols and polyether diols. Preferred dihydroxy compounds a2) are the polyesterdiols specified above. Particularly preferred are adipic acid-butanediol polyesters and adipic acid-hexanediol polyesters.

In order to achieve water-dispersibility for the polyurethanes, the polyurethanes are constructed from compounds a3) which have at least one group reactive toward isocyanate groups and also at least one anionic group. In accordance with the invention, "anionic group" also comprehends acid groups which can be converted into an anionic group by neutralization. The anionic groups are more particularly the sulfonate, carboxylate, and phosphate group, and/or the corresponding carboxylic acid, sulfonic acid, and phosphoric acid groups. Compound a3) is preferably selected from dihydroxycarboxylic acids, diaminocarboxylic acids, and diaminosulfonic acids. The fraction of the components having anionic groups among the total amount of the synthesis components for the polyurethane is preferably calculated such that the molar amount of the anionic groups, based on the amount by weight of all monomers (a1) to (a4), is 30 to 1000 mmol/kg, or 50 to 800 mmol/kg, or 50 to 500 mmol/kg, and more preferably 80 to 300 mmol/kg polyurethane.

Monomers having anionic groups, and/or having acid groups which are converted into an anionic group by neutralization, that are contemplated include, customarily, aliphatic, cycloaliphatic, araliphatic, or aromatic carboxylic acids and sulfonic acids which carry at least one alcoholic hydroxyl group or at least one primary or secondary amino group.

Preference is given to dihydroxyalkylcarboxylic acids, especially those having 3 to 10 carbon atoms, as are also described in U.S. Pat. No. 3,412,054. Especially preferred are compounds of the general formula ($c_1$)

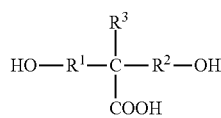

(c$_1$)

in which $R^1$ and $R^2$ are a $C_1$ to $C_4$ alkanediyl unit and $R^3$ is a $C_1$ to $C_4$ alkyl unit, and dimethylolpropionic acid (DMPA) in particular.

Additionally suitable are corresponding dihydroxyalkylsulfonic acids and dihydroxyalkylphosphonic acids, such as 2,3-dihydroxypropanephosphonic acid, for example. Otherwise suitable are dihydroxyl compounds having a molecular weight above 500 to 10 000 g/mol with at least 2 carboxylate groups, which are known from DE-A 3 911 827. They are obtainable by reaction of dihydroxyl compounds with tetracarboxylic dianhydrides such as pyromellitic dianhydride or cyclopentanetetracarboxylic dianhydride in a molar ratio of 2:1 to 1.05:1 in a polyaddition reaction. Especially suitable dihydroxyl compounds are the diols specified herein.

Contemplated as compounds a3) having amino groups reactive toward isocyanates are aminocarboxylic acids such as lysine, β-alanine, or the adducts of aliphatic diprimary diamines with α,β-unsaturated carboxylic or sulfonic acids that are specified in DE-A 2034479. Such compounds conform for example to the formula ($c_2$)

(c$_2$)

in which $R^4$ and $R^5$ independently of one another are a $C_1$ to $C_6$ alkanediyl unit, preferably ethylene, and X is COOH or SO3H. Particularly preferred compounds of the formula c2 are N-(2-aminoethyl)-2-aminoethanecarboxylic acid and N-(2-aminoethyl)-2-aminoethanesulfonic acid.

Further preferred are the adducts of the abovementioned aliphatic diprimary diamines with 2-acrylamido-2-methylpropanesulfonic acid, as are described in DE patent 1 954 090, for example. Likewise highly suitable compounds a3 are adducts of aliphatic diamines, as for example ethylenediamine or propylenediamine, with acrylates or methacrylates.

The anionic groups of the polyurethane are neutralized to an extent of at least 10 mol %, preferably at least 40 mol %, more preferably at least 70 mol %, very preferably at least 90 mol %, and more particularly completely (100 mol %) with a suitable neutralizing agent, and are therefore present in salt form, with the acid group being the anion and with the neutralizing agent being present as cation. Neutralizing agents are, for example, ammonia, alkali metal hydroxides such as NaOH or KOH, or alkanolamines.

The polyurethane may optionally be constructed from further compounds a4), different from the compounds a1) to a3). Compounds a4) serve, for example, for crosslinking or for chain extension. They are generally more than divalent nonphenolic alcohols, amines having 2 or more primary and/or secondary amino groups, and also compounds which as well as one or more alcoholic hydroxyl groups carry one or more primary and/or secondary amino groups.

Compounds a4) are, for example, nonpolymeric diols which have, for example, a molecular weight of 60 to 500 g/mol, preferably of 62 to 200 g/mol. Use may be made, for example, of the synthesis components of the short-chain alkanediols specified for the preparation of polyester diols, with preference being given to diols having 2 to 12 C atoms, unbranched diols having 2 to 12 C atoms and an even number of C atoms, and also pentane-1,5-diol and neopentyl glycol. The fraction of the dihydroxy compounds a2), based on the total amount of the diols, is preferably 10 to 100 mol %, and the fraction of the nonpolymeric diols, based on the total amount of diols, is preferably 0 to 90 mol %. With particular preference the molar ratio of the dihydroxy compounds a2) to the nonpolymeric diols is 0.1:1 to 5:1, more preferably 0.2:1 to 2:1.

Compounds a4) are, for example, also isocyanates which as well as free isocyanate groups carry further, masked isocyanate groups, e.g., uretdione groups or carbodiimide groups.

Alcohols having a functionality of more than 2, which may serve to set a degree of branching or degree of crosslinking, are trimethylolpropane, glycerol, or sugars, for example.

Polyamines having 2 or more primary and/or secondary amino groups are used especially when the chain extension and/or crosslinking is to take place in the presence of water, since amines generally react more quickly with isocyanates than do alcohols or water. This is frequently necessary when aqueous dispersions of crosslinked polyurethanes or polyurethanes with high molar weight are desired. The procedure in such cases is to prepare prepolymers with isocyanate groups, to disperse them rapidly in water, and then to carry out chain extension or crosslinking by addition of compounds having a plurality of amino groups reactive toward isocyanates. The polyurethanes may comprise, for example, 1 to 30 mol %, more preferably 4 to 25 mol %, based on the total amount of the groups that are reactive toward isocyanates, of at least one polyamine having at least 2 isocyanate-reactive amino groups, as monomers a4).

Amines suitable for this purpose are generally polyfunctional amines of the molar weight range from 32 to 500 g/mol, preferably from 60 to 300 g/mol, which comprise at least two amino groups, selected from the group of the primary and secondary amino groups. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate, or triamines such as diethylenetriamine or 1,8-diamino-4-aminomethyloctane. The amines may also be used in blocked form, as for example in the form of the corresponding ketimines (see, for example, CA-A 1,129,128), ketazines (cf., e.g., U.S. Pat. No. 4,269,748), or amine salts (see U.S. Pat. No. 4,292,226). Oxazolidines as well, as are used in U.S. Pat. No. 4,192,937, for example, represent masked polyamines, which can be used for preparing the polyurethanes of the invention for chain extending the prepolymers. Where such masked polyamines are used, they are generally mixed with the prepolymers in the absence of water, and this mixture is then mixed with the dispersion water or with a portion of the dispersion water, so that the corresponding polyamines are liberated by hydrolysis. Preference is given to using mixtures of diamines and triamines, more preferably mixtures of isophoronediamine (IPDA) and diethylenetriamine (DETA).

Alcohols having a functionality of more than 2, which may serve to set a certain degree of branching or degree of crosslinking, are trimethylolpropane, glycerol, or sugars, for example. For the same purpose it is also possible as compounds a4) to use isocyanates with a functionality of more than two. Examples of commercially customary compounds are the isocyanurate or the biuret of hexamethylene diisocyanate.

Further contemplated as compounds a4) are monoalcohols which as well as the hydroxyl group carry a further group reactive toward isocyanates, such as monoalcohols having one or more primary and/or secondary amino groups, e.g., monoethanolamine.

Compounds a4), which may optionally be used as well, are also monoisocyanates, monoalcohols, and monoprimary and monosecondary amines. In general their fraction is not more than 10 mol %, based on the total molar amount of the monomers. These monofunctional compounds customarily carry further functional groups such as olefinic groups or carbonyl groups, and serve for the introduction of functional groups into the polyurethane that allow the polyurethane to be dispersed and/or crosslinked or to undergo further polymer-analogous reaction. Monomers contemplated for this purpose are those such as isopropenyl-α,α-dimethylbenzyl isocyanate (TMI) and esters of acrylic or methacrylic acid such as hydroxyethyl acrylate or hydroxyethyl methacrylate.

Compounds a4) are also those which have at least one isocyanate group or one isocyanate-reactive group and another hydrophilic group, such as a nonionic group or a cationic group, for example, Contemplated in particular as nonionic hydrophilic groups are polyethylene glycol ethers composed of preferably 5 to 100, more preferably 10 to 80, repeating ethylene oxide units. The amount of polyethylene oxide units may be 0 to 10, preferably 0 to 6, weight %, based on the amount by weight of all compounds a1) to a4). Preferred monomers having nonionic hydrophilic groups are polyethylene oxide diols, polyethylene oxide monools, and also the reaction products of a polyethylene glycol and a diisocyanate that carry a terminally etherified polyethylene glycol radical. Diisocyanates of these kinds and also processes for preparing them are specified in patents U.S. Pat. No. 3,905,929 and U.S. Pat. No. 3,920,598.

It is common knowledge within the field of polyurethane chemistry how the molecular weight of the polyurethanes can be adjusted through choice of the proportions of the mutually reactive monomers and also the arithmetic mean of the number of reactive functional groups per molecule. Normally the synthesis components and also their respective molar amounts are selected such that the ratio A:B where A) is the molar amount of isocyanate groups and B) is the sum of the molar amount of the hydroxyl groups and the molar amount of the functional groups which are able to react with isocyanates in an addition reaction, is 0.5:1 to 2:1, preferably 0.8:1 to 1.5, more preferably 0.9:1 to 1.2:1. Very preferably the ratio A:B is as close as possible to 1:1.

The polyurethane synthesis components used carry on average customarily 1.5 to 2.5, preferably 1.9 to 2.1, more preferably 2.0 isocyanate groups and/or functional groups which are able to react with isocyanates in an addition reaction.

The polyurethane preferably consists to an extent of at least 50 weight %, more preferably at least 80 weight %, very preferably at least 90 weight % or 100 weight % of compounds a1) to a3).

The amount of compounds a4) is preferably less than 10 weight %, more preferably less than 5 or 2 weight %, very preferably less than 1 weight %, based in each case on the sum total of all polyurethane synthesis components. In one particularly preferred embodiment the polyurethane is synthesized exclusively from the compounds a1) to a3).

The polyaddition of the synthesis components for preparing the polyurethane that is present in the aqueous dispersions of the invention may take place at reaction temperatures of 20 to 180° C., preferably 70 to 150° C., under atmospheric pressure or under autogenous pressure. The reaction times required are typically in the range from 1 to 20 hours, more particularly in the range from 1.5 to 10 hours. Within the field of polyurethane chemistry, the way in which the reaction time is influenced by parameters such as temperature, monomer concentration, and monomer reactivity is known.

The reaction, i.e., the polyaddition of the synthesis components for the preparation of the polyurethanes, can be catalyzed using organic or organometallic compounds. Suitable catalysts include dibutyltin dilaurate (DBTL), tin(II) octoate, tetrabutoxytitanium (TBOT), or diazabicyclo[2.2.2] octane. Other suitable catalysts are salts of cesium, especially cesium carboxylates such as, for example, the formate, acetate, propionate, hexanoate, or 2-ethylhexanoate of cesium.

Polymerization apparatus contemplated for the implementation of the polyaddition, i.e., the reaction of the monomers a), b), c), and optionally d) and e), includes stirred tanks, especially when solvents are used as well to ensure low viscosity and effective removal of heat. Preferred solvents are of unlimited miscibility with water, have a boiling point under atmospheric pressure of 40 to 100° C., and react slowly, or not at all, with the monomers.

The dispersions may be prepared for example by one of the following processes: According to the "acetone process", an ionic polyurethane is prepared from the synthesis components in a solvent which is miscible with water and which boils below 100° C. under atmospheric pressure. Sufficient water is added to form a dispersion in which water represents the coherent phase.

The "prepolymer mixing process" differs from the acetone process in that, rather than a fully reacted (potentially) ionic polyurethane, a prepolymer is first of all prepared that carries isocyanate groups. The components in this case are selected such that the as-defined ratio A:B is greater than 1.0 and up to 3, preferably from 1.05 to 1.5. The prepolymer is first dispersed in water and then optionally crosslinked by reaction of the isocyanate groups with amines which carry more than 2 isocyanate-reactive amino groups, or chain extended by reaction of the isocyanate groups with amines which carry 2 isocyanate-reactive amino groups. Chain extension also takes place when no amine is added. In that case, isocyanate groups are hydrolyzed to amino groups, which are consumed by reaction with remaining isocyanate groups in the prepolymers, with chain extension.

Customarily, if a solvent has also been used during the preparation of the polyurethane, the major portion of the solvent is removed from the dispersion, by means of distillation under reduced pressure, for example, The dispersions preferably have a solvent content of less than 10 weight % and with particular preference are free from solvents. Solvents are understood to mean organic solvents.

The aqueous polyurethane dispersions obtained preferably have a solids content of 10 to 70, preferably of 30 to 55, weight %.

In N,N-dimethylformamide (DMF, 21° C.), the polyurethanes preferably have a K value of 20 to 60. The K value is a relative viscosity number, which is determined in analogy to DIN 53 726 at 25°. It comprises the flow rate of a 1 weight % strength solution of the polyurethane in DMF, relative to the flow rate of pure DMF, and characterizes the average molecular weight of the polyurethane.

The aqueous adhesive dispersion comprises at least one nonionic emulsifier selected from ethoxylated fatty alcohols. The amount of ethoxylated fatty alcohols in the dispersion is preferably 0.5 to 3%, more preferably from 0.5 to 2 weight %, based on the solid constituents in the dispersion.

Suitable fatty alcohols are, for example, those having 4 to 30, preferably 10 to 18, more particularly 16 to 18 C atoms in the fatty chain. The degree of ethoxylation is preferably from 8 to 50. Ethoxylated fatty alcohols are, for example, those of the formula Z(OCH2 CH2)m-OH, where Z is an alkyl group having 4 to 30, preferably 10 to 18, more particularly 16 to 18 C atoms and m is a number from 1 to 50, preferably from 8 to 50. Suitable examples include the ethoxylates of butanol, isobutanol, hexanol, octanol, decanol, dodecanol, tetradecanol, pentadecanol, hexadecanol, octadecanol, eicosanol, docosanol, tetracosanol, and triacontanol. Particularly preferred are fatty alcohols having 16 to 18 C atoms in the fatty chain and a degree of ethoxylation of 8 to 50.

The aqueous adhesive dispersion preferably comprises the polyurethane a) in an amount of 30 to 55 weight % based on the adhesive dispersion, and the nonionic emulsifier b) in an amount of 0.5 to 2 weight %, based on the total amount of solids.

In one preferred aqueous adhesive dispersion, the polyurethane a) is constructed from
  a1) at least one organic diisocyanate selected from the group consisting of hexamethylene diisocyanate, 1-isocyanato-3,5,5-trimethyl-5-isocyanatomethylcyclohexane, 2,6-diisocyanatotoluene, 2,4-diisocyanatotoluene, and tetramethylxylylene diisocyanate, or a mixture thereof,
  a2) at least one dihydroxy compound selected from adipic acid-butanediol polyester and adipic acid-hexanediol polyester,
  a3) at least one compound having at least one group reactive toward isocyanate groups, and additionally carrying at least one ionic group or one group which can be converted into an ionic group, selected from diaminocarboxylic acids and diaminosulfonic acids,
  a4) optionally further compounds different from a1) to a3),
  and the dispersion comprises
  b) from 0.5 to 2 weight %, based on the total amount of solids, of at least one nonionic emulsifier selected from $C_{16}$ to C18 fatty alcohols with a degree of ethoxylation of 8 to 50.

The aqueous polyurethane dispersions can be used without further additions as an adhesive. However, they may optionally comprise further auxiliaries and adjuvants. Examples of further constituents include crosslinkers, propellants, defoamers, further emulsifiers different from emulsifier b), thickeners, thixotropic agents, colorants such as dyes and pigments, plasticizers, or tackifying resins such as, for example, natural resins or modified resins such as rosin esters or synthetic resins such as phthalate resins. The aqueous composition may comprise crosslinkers desired for the particular use, examples being carbodiimides or aziridines.

The aqueous compositions or polyurethane dispersions are suitable for the coating of solid articles or flexible foils or sheets of metal, plastic, paper, textile, leather, or wood. The techniques that are generally customary—that is, for example, spraying or knifecoating—may be used for their application in the form of a film to these articles and for their drying. Drying may take place at room temperature or else at elevated temperature.

The adhesive dispersions may be used in particular as contact adhesives (double-sided application of adhesive), foam adhesives (adhesive comprises foaming agent), or laminating adhesives, as for example for interior automotive components or for furniture lamination or for composite film lamination. Examples of substrates for bonding include those made of wood, metal, plastic, fiber moldings, e.g., MDF boards, or paper.

In particular the polyurethane dispersions of the invention are suitable as adhesives or as binders for adhesives, particular preference being given to laminating adhesives. Thus a distinction should be made between the 1K (one-component) and 2K (two-component) systems. The aqueous compositions are suitable both as 1K or 2K systems. 1K systems may comprise a crosslinker and are stable on storage. In the case of 2K systems, the crosslinker is not added until shortly before use. The adhesive dispersions may also be free from compounds which undergo crosslinking reaction with the polyurethane. In that case the polyurethane dispersions of the invention may be used preferably as one-component (1K) adhesives, more particularly 1K laminating adhesives.

Articles made of metal, plastic, paper, leather, wood, or fiber moldings, such as MDF boards, for example, may likewise be bonded to other articles, preferably to the aforementioned articles, by application of the aqueous dispersion of the invention in the form of a film to at least one of these articles, and the joining thereof, before or after the drying of the film, to another article. In this case the film is heated preferably to temperatures of 50 to 150° C.

In the case of use as a laminating adhesive for the surface enhancement of a solid support with a decorative foil, generally speaking, polymer foils, paper, more particularly decorative papers coated or impregnated with a polymer, or leather, are bonded in particular to articles made of wood, a term including bonded wood fiber materials such as chipboard or other boards comprising cellulose materials, or else to metal or plastic. For example, pieces of furniture or furniture parts are laminated with paper or polymer foils, or interior automotive components are laminated with polymer foils made from PVC or TPO.

The polyurethane dispersions are suitable particularly as adhesive for the lamination of rigid moldings with flexible decorative foils or for the production of composite films. The foil materials essentially used are polyethylene, polypropylene, especially biaxially oriented polypropylene (OPP), polyimide, polyester, PVC, cellulose acetate, cellophane, and metals such as tin and aluminum, including, in particular, metalized polymer foils, e.g., metalized polyolefin foils or polyester foils. The polymer foils, especially polyolefin foils, may optionally have been corona-pretreated.

In the case of the 1K systems it is also possible first to apply the composition of the invention to the polymer foil for lamination, or to the paper for lamination, and to store the coated polymer foil or coated paper until, at a later point in time, the lamination—of the furniture part or interior automotive component, for example—is to take place.

The laminating adhesive is preferably applied to at least one, and generally only to one, of the substrates to be bonded. The coated substrates are generally dried for a short time and then pressed with one another or with uncoated substrates at a temperature of 30 to 80° C. preferably.

The polyurethane dispersion of the invention has a low viscosity. When the polyurethane dispersion of the invention or compositions of the invention are used as adhesive or as laminating adhesive, the resulting composites have high strength, including, in particular, high heat stability, i.e., strength at elevated temperature. The compositions of the invention in the form of a 1K system (crosslinker with blocked reactive groups) are storage-stable and may be applied to the polymer foils or paper to be laminated, and stored in that form.

EXAMPLES

Example 1

Aqueous dispersion comprising
(a) 40 parts by weight of polyurethane, formed from
    4 parts by weight of diisocyanatotoluene (2,4- or 2,6-diisocyanatotoluene)
    4 parts by weight of hexamethylene diisocyanate
    87 parts by weight of adipic acid/butanediol polyester with molecular weight Mn of 2400
    5 parts by weight of the sodium salt of ethylenediaminemonopropionic acid
(b) 1 weight % (based on polyurethane) of Lutensol® AT 18 (C16-18 fatty alcohol, ethoxylated with 18 units of ethylene oxide)

Example 2

Aqueous dispersion comprising
(a) 40 parts by weight of polyurethane, formed from
    4 parts by weight of diisocyanatotoluene (2,4- or 2,6-diisocyanatotoluene)
    4 parts by weight of hexamethylene diisocyanate
    87 parts by weight of adipic acid/butanediol polyester with molecular weight Mn of 2400
    5 parts by weight of the sodium salt of ethylenediaminemonopropionic acid
(b) 1 weight % (based on polyurethane) of Lutensol® AT 25 (C16-18 fatty alcohol, ethoxylated with 25 units of ethylene oxide)

Example 3 (Comparative; No Additive)

Aqueous dispersion comprising
40 parts by weight of polyurethane, formed from
4 parts by weight of diisocyanatotoluene (2,4- or 2,6-diisocyanatotoluene)
4 parts by weight of hexamethylene diisocyanate
87 parts by weight of adipic acid/butanediol polyester with molecular weight Mn of 2400
5 parts by weight of the sodium salt of ethylenediaminemonopropionic acid Example 4 (Comparative)

Aqueous dispersion comprising
(a) 40 parts by weight of polyurethane, formed from
    4 parts by weight of diisocyanatotoluene (2,4- or 2,6-diisocyanatotoluene)
    4 parts by weight of hexamethylene diisocyanate
    87 parts by weight of adipic acid/butanediol polyester with molecular weight Mn of 2400
    5 parts by weight of the sodium salt of ethylenediaminemonopropionic acid
(b) 1 weight % (based on polyurethane) of Pluronic® PE 6800 (nonionic ethylene oxide/propylene oxide (80:20) block copolymer; Mw 1750)

Example 5 (Comparative)

Aqueous dispersion comprising
(a) 40 parts by weight of polyurethane, formed from
    4 parts by weight of diisocyanatotoluene (2,4- or 2,6-diisocyanatotoluene)
    4 parts by weight of hexamethylene diisocyanate
    87 parts by weight of adipic acid/butanediol polyester with molecular weight Mn of 2400
    5 parts by weight of the sodium salt of ethylenediaminemonopropionic acid
(b) 1 weight % (based on polyurethane) of Pluronic® PE 10500 (nonionic ethylene oxide/propylene oxide (50:60) block copolymer; Mw 3250)

Measurements

Shear Stability Test

A sample of the dispersion for testing is subjected to shearing at 10 000 rpm for 10 minutes using a disperser disk. The LT before and after shearing is measured. Shear instability is manifested in a drop in LT (formation of microcoagulum). The smaller the drop, the more stable the dispersion is with respect to shearing.

LT

Light transmittance; variable for determining particle sizes in disperse systems. The polymer dispersion here is diluted to 0.01% solids content, and the light transmittance is measured in % in comparison to pure water.

Foam Development Test

A determination is made of the rise in the amount of foam (increase in foam volume, in %) during the shear stability test.

Electrolyte Stability Test

One drop of the dispersion under investigation is allowed to drop into a calcium chloride solution of defined concentration, and the mixture is shaken. If the drop dissolves in the solution, without visible coagulum formation, this concentration of calcium chloride is deemed to be compatible. The higher the maximum compatible calcium chloride concentration, the more electrolyte-stable the dispersion.

Examples

PUD: Polyester polyurethane dispersion consisting of TDI/HDI/adipic acid butanediol/PUD salt (Luphen D 200 A)

|  | Additive (1 weight %, solid on solid) | Shear stability (% LT drop) | Electrolyte stability [g/l CaCl$_2$] | Foam development [%] |
| --- | --- | --- | --- | --- |
| Example 1 | Lutensol ® AT 18 | 2 | 0.4 | 100 |
| Example 2 | Lutensol ® AT 25 | 2 | 0.4 | 100 |
| Example 3 (comparative) | — | 30 | 0.01 | 80 |
| Example 4 (comparative) | Pluronic ® PE6800 | 1 | 0.03 | 150 |
| Example 5 (comparative) | Pluronic ® PE10500 | 2 | 0.03 | 150 |

The addition of the Lutensol® additives in examples 1 and 2 does not cause any change in the adhesive properties relative to example 3. The relevant adhesive properties are application-specific, and in the case of the laminating applications include peel strengths, which are determined at room temperature or at 90° C. immediately after the production of the laminate, and also 24 hours after production of the laminate.

The invention claimed is:

1. An aqueous adhesive dispersion, comprising:
   a) 30 to 55 weight % of at least one dispersed polyurethane, based on the aqueous adhesive dispersion, constructed from
      a1) at least one organic diisocyanate of the formula: X(NCO)$_2$, where X is a noncyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 15 carbon atoms,
      a2) at least one dihydroxy compound selected from the group consisting of a polyester diol and a polyether diol, the polyester diol being formed from at least one aliphatic dicarboxylic acid and at least one alkanediol, and the polyether diol being selected from the group consisting of a polypropylene oxide and a polytetrahydrofuran,
      a3) at least one compound having at least one group reactive toward isocyanate groups, and additionally carrying at least one ionic group or one group which can be converted into an ionic group, and
      a4) optionally at least one further compound different from a1) to a3); and
   b) 0.5 to 2 weight % of at least one nonionic emulsifier, based on a total amount of solids, comprising an ethoxylated fatty alcohol.

2. The aqueous dispersion according to claim 1, wherein the diisocyanate a1) is selected from the group consisting of hexamethylene diisocyanate, 5-isocyanato-1-(isocyanatomethyl)-1,3,3-trimethylcyclohexane, 2,6-diisocyanatotoluene, 2,4-diisocyanatotoluene, tetramethylxylylene diisocyanate, and a mixture thereof.

3. The aqueous dispersion according to claim 1, wherein the dihydroxy compound a2) is selected from the group consisting of an adipic acid-butanediol polyester and an adipic acid-hexanediol polyester.

4. The aqueous adhesive dispersion according to claim 1, wherein the dihydroxy compound a2) has a number-average molar weight of 500 to 5000 g/mol and comprises no ionic group or group which can be converted into an ionic group.

5. The aqueous dispersion according to claim 1, wherein the compound a3) is selected from the group consisting of a dihydroxycarboxylic acid, a diaminocarboxylic acid and a diaminosulfonic acid.

6. The aqueous dispersion according to claim 1, wherein:
   a1) the at least one organic diisocyanate is selected from the group consisting of hexamethylene diisocyanate, 1-isocyanato-3,5,5-trimethyl-5-isocyanatomethylcyclohexane, 2,6-diisocyanatotoluene, 2,4-diisocyanatotoluene, tetramethylxylylene diisocyanate, and a mixture thereof,
   a2) the at least one dihydroxy compound is selected from the group consisting of adipic acid-butanediol polyester and adipic acid-hexanediol polyester,
   a3) the at least one compound having at least one group reactive toward isocyanate groups, and additionally carrying at least one ionic group or one group which can be converted into an ionic group, is selected from the group consisting of a diaminocarboxylic acid and a diaminosulfonic acid,
   and
   b) the at least one nonionic emulsifier is a C16 to C18 fatty alcohol with a degree of ethoxylation of 8 to 50.

7. The aqueous dispersion according to claim 1, wherein the ethoxylated fatty alcohol b) is a C16 to C18 fatty alcohol with a degree of ethoxylation of 8 to 50.

8. A laminating adhesive, comprising the aqueous adhesive dispersion of claim 1.

9. An aqueous adhesive dispersion, comprising:
   a) at least one dispersed polyurethane constructed from
      a1) at least one organic diisocyanate of the formula: X(NCO)$_2$, where X is a noncyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 15 carbon atoms,
      a2) at least one dihydroxy compound selected from the group consisting of an adipic acid-butanediol polyester and an adipic acid-hexanediol polyester, a3) at least one compound having at least one group reactive toward isocyanate groups, and additionally carrying at least one ionic group or one group which can be converted into an ionic group, and a4) optionally at least one further compound different from a1) to a3); and b) at least one nonionic emulsifier comprising an ethoxylated fatty alcohol.

10. The aqueous dispersion according to claim 9, wherein the diisocyanate a1) is selected from the group consisting of hexamethylene diisocyanate, 5-isocyanato-1-(isocyanatomethyl)-1,3,3-trimethylcyclohexane, 2,6-diisocyanatotoluene, 2,4-diisocyanatotoluene, tetramethylxylylene diisocyanate, and a mixture thereof.

11. The aqueous adhesive dispersion according to claim 9, wherein the dihydroxy compound a2) has a number-average molar weight of 500 to 5000 g/mol and comprises no ionic group or group which can be converted into an ionic group.

12. The aqueous dispersion according to claim 9, wherein the compound a3) is selected from the group consisting of a dihydroxycarboxylic acid, a diaminocarboxylic acid and a diaminosulfonic acid.

13. The aqueous dispersion according to claim 9, wherein the ethoxylated fatty alcohol b) is a C16 to C18 fatty alcohol with a degree of ethoxylation of 8 to 50.

14. The aqueous dispersion according to claim 9, wherein:

a1) the at least one organic diisocyanate is selected from the group consisting of hexamethylene diisocyanate, 1-isocyanato-3,5,5-trimethyl-5-isocyanatomethylcyclohexane, 2,6-diisocyanatotoluene, 2,4-diisocyanatotoluene, tetramethylxylylene diisocyanate, and a mixture thereof, a3) the at least one compound having at least one group reactive toward isocyanate groups, and additionally carrying at least one ionic group or one group which can be converted into an ionic group, is selected from the group consisting of a diaminocarboxylic acid and a diaminosulfonic acid, and the aqueous dispersion comprises:

b) from 0.5 to 2 weight %, based on the total amount of solids, of at least one nonionic emulsifier which is a C16 to C18 fatty alcohol with a degree of ethoxylation of 8 to 50.

15. An aqueous adhesive dispersion, comprising:

a) at least one dispersed polyurethane constructed from a1) at least one organic diisocyanate of the formula: $X(NCO)_2$, where X is a noncyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 15 carbon atoms, a2) at least one dihydroxy compound selected from the group consisting of a polyester diol and a polyether diol, the polyester diol being formed from at least one aliphatic dicarboxylic acid and at least one alkanediol, and the polyether diol being selected from the group consisting of a polypropylene oxide and a polytetrahydrofuran, a3) at least one compound having at least one group reactive toward isocyanate groups, and additionally carrying at least one ionic group or one group which can be converted into an ionic group, and a4) optionally at least one further compound different from a1) to a3); and b) at least one nonionic emulsifier comprising an ethoxylated fatty alcohol, wherein the ethoxylated fatty alcohol is a C16 to C18 fatty alcohol with a degree of ethoxylation of 8 to 50.

16. The aqueous dispersion according to claim 15, comprising:

30 to 55 weight % of the polyurethane a), based on the aqueous adhesive dispersion; and 0.5 to 2 weight % of the nonionic emulsifier b), based on a total amount of solids.

17. The aqueous dispersion according to claim 15, wherein the diisocyanate a1) is selected from the group consisting of hexamethylene diisocyanate, 5-isocyanato-1-(isocyanatomethyl)-1,3,3-trimethylcyclohexane, 2,6-diisocyanatotoluene, 2,4-diisocyanatotoluene, tetramethylxylylene diisocyanate, and a mixture thereof.

18. The aqueous dispersion according to claim 15, wherein the dihydroxy compound a2) has a number-average molar weight of 500 to 5000 g/mol and comprises no ionic group or group which can be converted into an ionic group.

19. The aqueous dispersion according to claim 15, wherein the compound a3) is selected from the group consisting of a dihydroxycarboxylic acid, a diaminocarboxylic acid and a diaminosulfonic acid.

* * * * *

UNITED STATES PATENT AND TRADEMARK OFFICE
CERTIFICATE OF CORRECTION

PATENT NO.         : 10,240,071 B2
APPLICATION NO.    : 15/529177
DATED              : March 26, 2019
INVENTOR(S)        : Karl-Heinz Schumacher et al.

It is certified that error appears in the above-identified patent and that said Letters Patent is hereby corrected as shown below:

In the Specification

Column 2, Lines 16-17, "isocyanatonnethylcyclohexane" should read -- isocyanatomethylcyclohexane --.

Column 4, Line 26, "SO3H." should read -- $SO_3H$. --.

Column 8, Line 35, "C18" should read -- $C_{18}$ --.

Column 9, Line 34, "polyimide" should read -- polyamide --.

Signed and Sealed this
Fourth Day of February, 2020

Andrei Iancu
*Director of the United States Patent and Trademark Office*